United States Patent [19]
Schneier et al.

[11] Patent Number: 5,956,404
[45] Date of Patent: Sep. 21, 1999

[54] DIGITAL SIGNATURE WITH AUDITING BITS

[76] Inventors: Bruce Schneier, 7115 W. Oak Park Ave., Oak Park, Ill. 60302; John Kelsey, 105 Ventura #C, Jefferson City, Mo. 65109

[21] Appl. No.: 08/724,622

[22] Filed: Sep. 30, 1996

[51] Int. Cl.$^6$ .................................................. H04L 9/00
[52] U.S. Cl. ............................................. 380/25; 380/30
[58] Field of Search ....................................... 380/25, 30

[56] References Cited

U.S. PATENT DOCUMENTS

| 5,136,646 | 8/1992 | Haber et al. ............................. | 380/49 |
| 5,136,647 | 8/1992 | Haber et al. ............................. | 380/49 |
| 5,164,988 | 11/1992 | Matyas et al. ........................... | 380/25 |

Primary Examiner—Salvatore Cangialosi
Attorney, Agent, or Firm—Joseph Yang; Skadden, Arps

[57] ABSTRACT

A method for digitally signing a message by a tamper-resistant device to generate a digital signature. The method includes the step of hashing the message to form message bits; and encrypting with a private key the message bits, redundancy bits for the security of the signature, and auditing bits to form the digital signature for the message. The auditing bits provide an audit trail for the message. The auditing bits include one or more of the following categories: signature-packet version bits to identify the version of the device generating the signature; device ID bits to identify the token generating the digital signature; key ID bits to identify the private key; a packet-sequence number, which increments every time the device generates a signature to indicate the sequence of signatures generated; bits generated by hashing the prior signature to provide an auditing trail of signatures generated and a time-stamp to indicate the time when the signature is generated. The auditing bits may further include a random number.

20 Claims, 7 Drawing Sheets

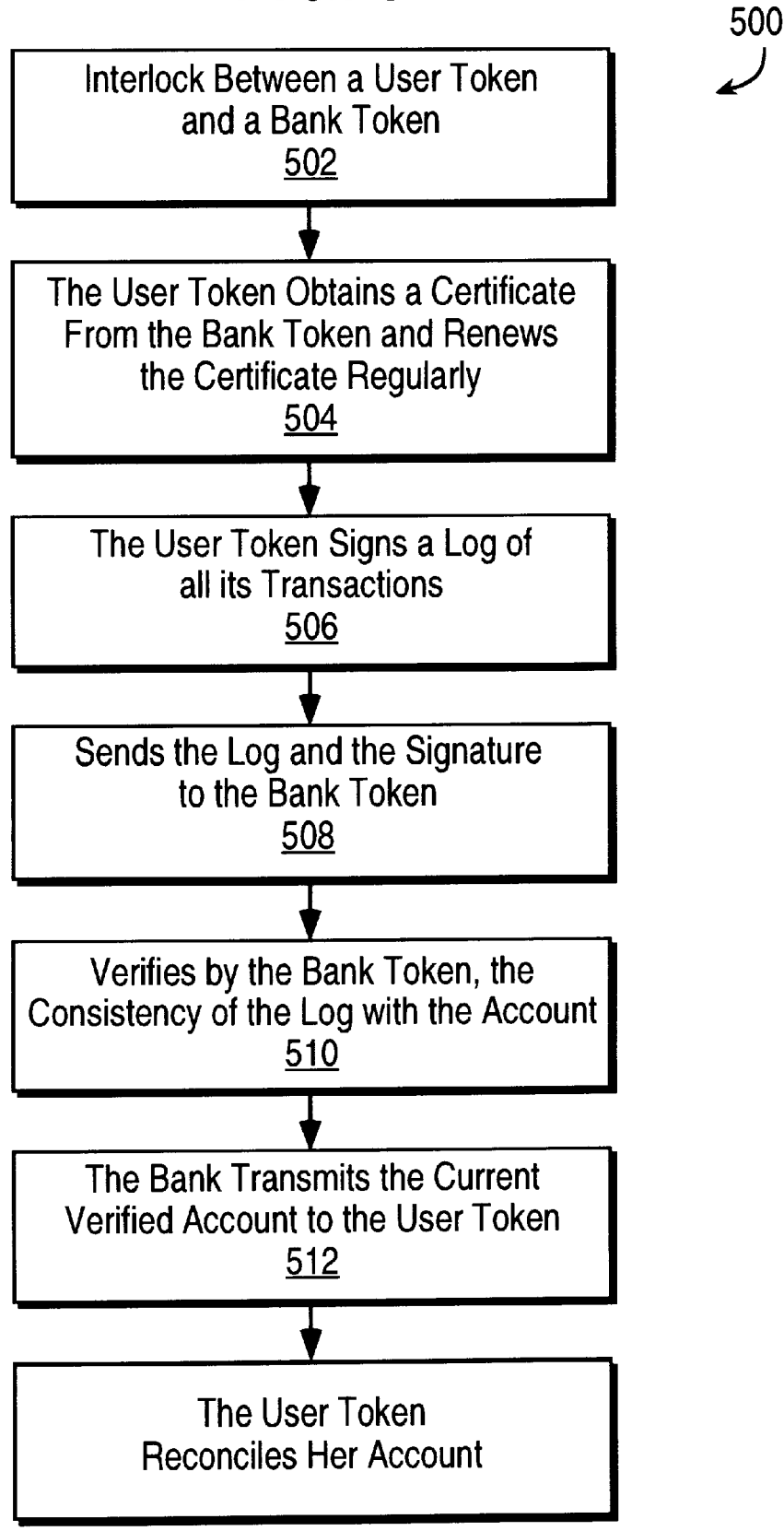

DIGITAL SIGNATURE WITH AUDITING BITS

BACKGROUND OF THE INVENTION

This invention relates to cryptographic techniques, and more particularly to digital signatures.

For centuries, people have been searching for ingenious methods to communicate privately and secretly. The methods can simply be substituting one letter for another as Julius Caesar did, or as complicated as the mechanical "Enigma" system used by the Germans during W.W.II, which took hundreds of researchers years to crack.

Many secret communication methods depend on some secret information, also known as a "secret code," agreed upon between the sender and the receiver. The sender is also known as the sender token, and the receiver is also known as the receiver token; each token can be a computer, a person or even just an intelligent bank card. The complexity of the problem significantly increases when the sender and the receiver have never met before, such as a buyer trying to pay for a coat bought from a seller through the Internet by giving the seller his or her charge card number. If they have not met before, they cannot securely settle on a secret code to communicate among themselves. The secret code has to be set through some initial communication. Unfortunately, the initial communication can be eavesdropped, with the secret code exposed.

The public-private key encryption technique has resolved the above-identified problem. Based on a public-key/private-key key pair, every digital message can be encrypted by any one of the key and decrypted by the other, with the public keys recorded in a public directory, which is publicly accessible, and the private key privately retained. Typically, the sender of the message would go to the public-key directory to look for the receiver's public key. Then the sender would encrypt the message with the receiver's public key, and convey the encrypted message to the receiver. The receiver, upon getting the encrypted message, decrypts the message with her private key. Such a public-private key scheme resolves the problem of maintaining the secrecy of a communication. However, when the receiver gets the message, the receiver cannot be certain that the message is from the sender. The receiver would like to have the equivalence of a signature on the message.

The public-private key encryption technique can also be used to generate a digital signature to authenticate the sender. Typically, the sender would hash the message with a one-way hashing function that is publicly known and is an agreed-upon standard, such as published in the newspaper. Hashing a message is a computation applied to a message that collapses the message and transforms it to a unique value—no two messages have the same value. After hashing, the sender would digitally sign the message by encrypting the hashed message with her private key. Both the digital signature and the message will be encrypted by the receiver's public key, and are then sent to the receiver. The receiver, upon getting the information, decrypts it, and extracts the digital signature from it. Then the receiver gets the sender's public key from the public directory to decrypt the digital signature to get back the same message. This operation ensures the identity of the sender because she is the only person who can encrypt the message with her private key. One cryptosystem that allows digital signatures with message-recovery is RSA. There are also ElGamal variants, which allow signing with message recovery.

Basic concepts on public-key encryption, digital signatures, and one-way hash functions are well known to those with ordinary skill in the art of cryptography. Details can be found in many textbooks, including Applied Cryptography, 2nd Edition, by Bruce Schneier (John Wiley & Sons, 1996).

The above described operations or protocols are secure as long as the encryption scheme is not broken. One way to break a protocol is to reverse-engineer the physical system that executes the protocol, and to then modify the protocol. One solution to this problem is to execute the protocol in a tamper-resistant hardware device. There are many techniques for making hardware device (such as a portable computer or a token) tamper-resistant, and they are well known in the current art. Examples of tamper-resistant hardware include PC-MCIA cards from National Semiconductor, Inc. and Datakey, button-memory devices from Dallas Semiconductor, Inc., and authenticator tokens by Security Dynamics, Inc. The U.S. government uses tamper-resistant hardware for many of its military encryption and decryption equipment.

Another way to break the protocol is to break the public-private key encryption one of the cryptographic algorithms (the public key algorithm, the hash function, the bulk encryption algorithm, etc.), which can be an almost impossible task. A public-key key-size of more than 512 bits would require over ten thousand MIP years to break with conventional computational methods and equipment.

However, if one is not careful, his protocols can still be broken. For example, in 1995, two researchers broke Netscape's protocol. They did not break the public-private key encryption, but they broke the key-generation procedure. In Netscape's protocol, two users, after they have secured communication through exchanging their keys, would transmit to each other a "secret code" or a session key based on their secured communication channel. From that point onwards, their communication will be encrypted using the session key, because an encryption using a session key needs much less time than an encryption method based on the public-private key set. Typically, a session key is based on a long random number. In Netscape case, a part of the session key is based on predictable numbers, such as the serial number of one of the user's computer. The two researchers somehow figured out the predictable part of the session key, broke it and exposed the secured communication between the users.

No matter how strong a protocol is, there might be a possibility that it can be broken, reverse-engineered, or it can be stolen. A user, after being aware that her protocol has been broken, should be protected from the attacker or the intruder changing the protocol and convincing her to use the old, broken protocol as if it were a new protocol. There has to be some auditing trail established so that she could trace back all the transactions by the hardware device (or software program) token to ensure her that what she has is a new protocol. This auditing trail can be based on the version of the protocol, the ID number of the hardware device (or software program)token and the ID number of the public-private key set. But, no matter what the trail is based on, there should be some way to ensure the user the security of her token.

Similarly, the user might encounter the same problem if she has lost her hardware device token or if her hardware device token has been stolen. There must be some way to protect her so that unauthorized use could only last for a short duration of time, and all the unauthorized use can be traced back so that she is not liable for any of those transactions. Again, one needs to have an audit trail created to trace the sequence of events or transactions using the hardware device token. This would help the user to recover after losing her hardware device token or after her hardware device token was broken into.

There are also many applications with a need for strong audit trail. The most obvious applications with such needs are for key certification and key escrow agencies. In both cases, operations such as certifying public keys, recovering private or secret keys should not be performed without leaving an audit trail.

Another application with a need for auditing is electronic commerce. There are many financial interactions that would benefit from a strong audit trail: smart-card credit or debit cards interacting with an Automatic Teller Machine or a point-of-sale credit-card validation machine, Internet-based purchasing software interacting with commercial Websites, consumers interacting with Internet-based gambling services, etc. In all of these circumstances there is the need to establish an audit trail of actions between the various parties, so that an arbitrator (a judge, regulatory agency, etc.) can reconstruct events after they occurred.

One way to establish such an auditing trail is to use a portion of the message bits as a storage of all prior transactions of the hardware device (or software program)token. The prior transaction bits after they are hashed are sent out as a part of the message bits, and are stored by the recipient of the message. Such a process would create an audit trail because by unhashing the chain, one can trace back what has happened. Even if the hardware device token is broken, or the secure software process is reverse-engineered and modified, the attacker cannot change whatever that has been sent to the recipients in the past. The problem with this approach is that it wastes valuable space that could have been used for the message.

It should be apparent from the foregoing that there is still a need for an encryption scheme that has a strong audit trail while not wasting a lot of the valuable message space.

SUMMARY OF THE INVENTION

The present invention provides a strong audit trail for an encryption scheme that does not waste any of the valuable message space. The audit trail can be based on the source or the identity of a device token, such as the ID of the device token, the ID of the public-private key or the encryption scheme. The audit trail can also be based on the sequence of events or transactions carried out by the device token, which is typically tamper-resistant. In the present invention, a device can be a physical device or a software program.

As described in the background section, in order to authenticate a message, it is digitally signed using the private key of the sender of the message. The signing process is typically done through hashing the message, and then encrypting the hashed message by the private key. In order to ensure that the encryption becomes extremely difficult to break, the hashed message is usually padded to increase the size of the package to be signed—the signature package—to at least 512 bits. Padding schemes are well known in the current art; one is described in RSA Data Security, Inc.'s Public Key Cryptography Standards (PKCS) documents. The present invention, using the padded space, puts the auditing bits in the signature package. This approach would not waste message space, and would create a strong audit trail for the device token.

In one preferred embodiment, the signature packet includes the message bits, which are formed by hashing a message; auditing bits; and redundancy bits for the security of the signature. The auditing bits may be used to trace the identity of the source generating the message by including one or more of the following fields: signature-packet version bits to identify the version of the device token generating the signature; device token ID bits, which identify the device token generating the digital signature; or key ID bits, which identify the private key encrypting the signature package. The auditing bits may also be used to trace the sequence of events or transactions operated on by the device token through including the packet-sequence number, which increments every time the device token generates a signature. A different signature has a different packet-sequence number; and the packet-sequence number indicates the sequence of signatures generated by the device token. Another preferred type of auditing bits that can trace the sequence of events is bits representing the hashing of the immediate prior signature signed by the card. This would provide an audit trail where every signature includes its immediately prior signature. It would be quite difficult for an intruder to change such type of audit trail because she has to change every previous signature. In another preferred embodiment, the signature package further includes a field that represents a time-stamp to indicate the time when the signature is generated, and/or another field that represents a random number. In different preferred embodiments, the signature package may include one or more of the above fields.

The invented signature package may be applied to many different applications. For example, it can be incorporated into an interlock protocol to prevent man-in-the-middle attack, a digital time-stamping proxy and guaranteed checking account for spending and reconciliation.

Other objects, aspects, and advantages of the present invention will become apparent from the following detailed description, which, when taken in conjunction with the accompanying drawings, illustrates by way of example the principles of the invention.

BRIEF DESCRIPTION OF THE DRAWINGS

FIG. 9 shows a reconciliation application based on a guaranteed checking account with digital signatures generated by preferred methods in the present invention.

Same numerals in FIGS. 1–9 are assigned to similar elements in all the figures. Embodiments of the invention are discussed below with reference to FIGS. 1–9. However, those skilled in the art will readily appreciate that the detailed description given herein with respect to these figures is for explanatory purposes as the invention extends beyond these limited embodiments.

DETAILED DESCRIPTION OF THE INVENTION

Figure 1:
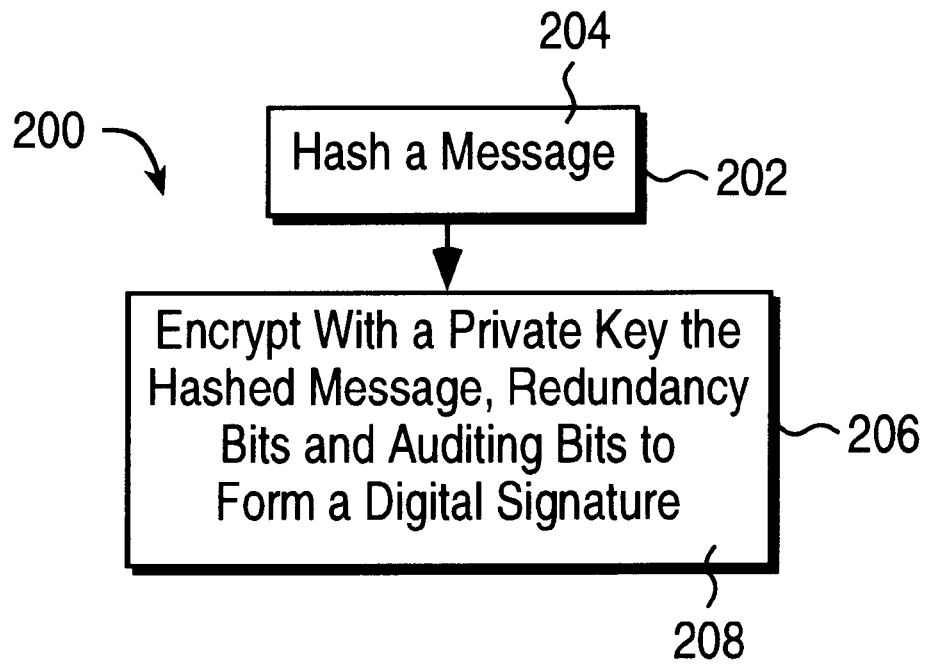
FIG. 1 shows a preferred method to digitally sign a message in the present invention.

FIG. 1 shows a preferred method 200 using a tamper-resistant token to digitally sign a message 204 to form a digital signature 208 in the present invention. The message may be generated by the token, or may be received by the token. In the preferred method 200, the message 204 is hashed 202 to form message bits. The message bits with redundancy bits and auditing bits form a signature packet which is encrypted 206 by a private key to form the digital signature 208. The digital signature 208 and the message 204 are then ready to be sent to a receiving token. Note that the methods to generate a tamper-resistant token, including a tamper-resistant card, should be obvious to those of normal skill in the art, and will not be further described in this application.

Figure 2:
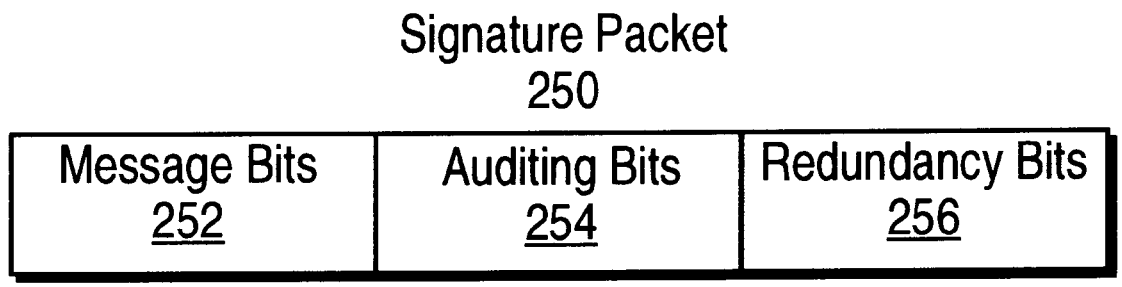
FIG. 2 shows a preferred embodiment of a signature packet to be encrypted to form a digital signature in the present invention.

The preferred embodiment uses a tamper-resistant token 200, but those of ordinary skill in the art will realize that the token could alternatively be a PC-MCIA card, a processor in a "button" (similar to the one sold by Dallas Semiconductor, Inc.), a cryptographic smart-card, an electronic wallet, a "dongle" attached to a computer or other processing hardware device, or a secure microprocessor. Instead of a tamper-resistant token, 200 could be a secure software program executing on a computer, a software program executing on a tamper-resistant personal computer, a software program executing on a computer running in a secure environment, a software program running on a secure computer, or a software program running on a computer with a secure operating system. FIG. 2 shows a preferred embodiment of a signature packet 250, which includes the message bits 252, the auditing bits 254 and the redundancy bits 256. For the security of the signature, the signature packet 250 includes the redundancy bits, which should be a well known practice to those skilled in the art. The auditing bits 254 provide an audit trail for the message 204.

Figure 3:
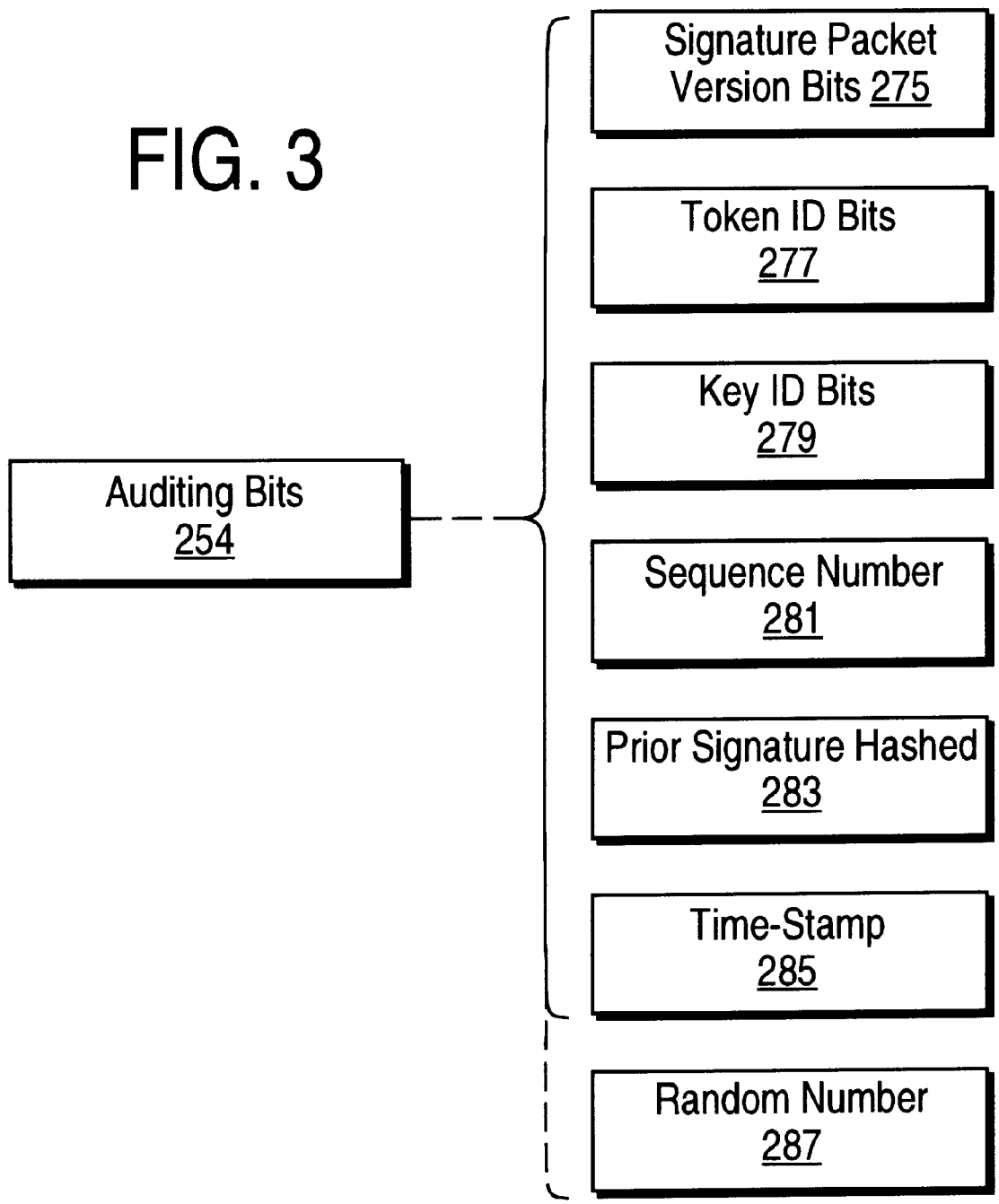
FIG. 3 shows a few preferred embodiments for the auditing bits in the present invention.

FIG. 3 shows a few preferred fields for the auditing bits in the present invention, including signature-packet version bits 275, token ID bits 277, key ID bits 279, a packet-sequence number 281, prior signature hash 283 and a time-stamp 285. One additional field in the auditing bits, which may not have significant auditing capability, is a random number 287. The auditing bits may include one or more of the preferred fields, for example, the auditing bits may include the signature-packet version bits 275 and the time-stamp 285. Each of these fields except the random number is useful for preventing or increasing the difficulty of some kinds of attack.

The signature-packet version bits 275 indicate to the receiver of the signature packet 250 the version of the token generating the signature, so as to inform the receiver how the signature packet is to be processed. In one preferred embodiment, the signature-packet version bits 275 is a 23-bit field that is at the beginning of the signature packet, with the following structure:

| bits 0 ... 7 | reserved-set to all zeros for version 1. |
|---|---|
| bits 8 ... 15 | version bits-supports up to 255 other versions. |

Typically, a given version number corresponds to a number of features, including digital signature algorithm, key size, signature packet format, hash function, symmetric and asymmetric encryption. As an example, version 1 might correspond to signature and asymmetric encryption algorithm RSA with a 768-bit modulus, hash function SHA1, symmetric encryption function two-key triple-DES, and without a time stamp and a random number; and version 2 might correspond to the same types of fields, but with a 64 bit token-generated random number. A recipient of a signature packet with version 2 would then know that, if the sender's tamper-resistance had not been defeated, the token has generated a random number in the signature packet. Information on the algorithms RSA, SHA1, and triple-DES can be found in any modem book on cryptography.

By including the signature-packet version, the present invention prevents some kinds of replay attack, which involve trying to get a system to use an older signature packet version. Moreover, the signature packet version becomes explicit, making it easier for the receiving token to scan the version and then decide to accept or to refuse to accept it. The signature-packet version also allows backward compatibility if later versions add more fields or change the width of the signature packet, since the signature-packet version bits 275 can be easily found. This is because the signature-version bits are typically located at the beginning of the signature packet and with a pre-defined number of bits, such as 23 bits.

The token ID bits 277 identifies the token generating the digital signature. The presence of the token ID 277 simplifies the problem of tracing lost or stolen tokens. In most cases, lost or stolen tokens are traced by the token ID bits 277, the key ID bits 279, and the packet-sequence number 281. In one preferred embodiment, the token has a unique 48-bit ID.

The key ID bits 279 identifies the private key encrypting the signature packet 250. Typically, this key ID is included in key certificates and can be fit into an X.509 certificate. (X.509 is a world-wide standard format for certificates.) In one preferred embodiment, the key ID is 48 bits.

Figure 4:
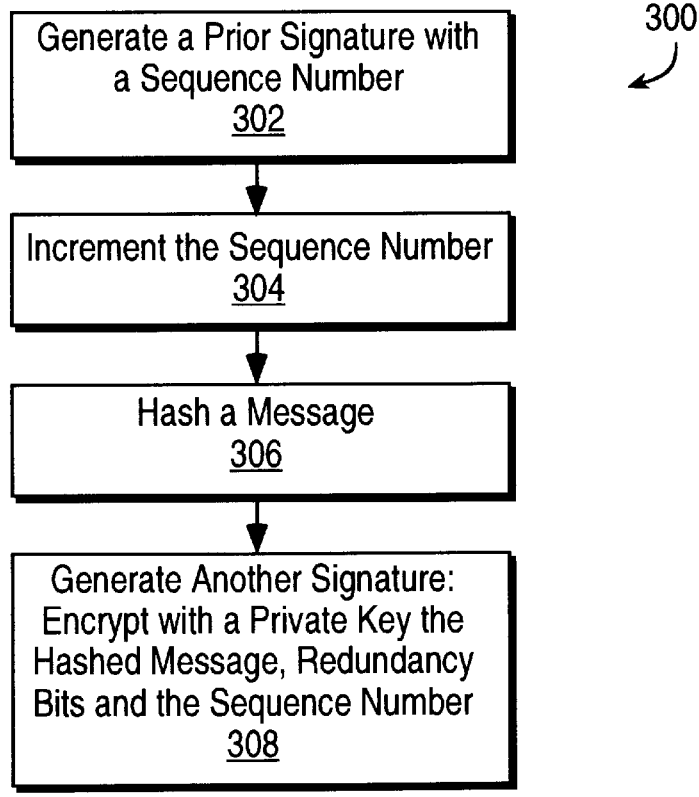
FIG. 4 shows a preferred method in the present invention to generate a digital signature, which includes a packet-sequence number.

The packet-sequence number 281 indicates the sequence of signatures generated by the token—a different signature from the token has a different sequence number 281. FIG. 4 shows a preferred method 300 in the present invention to generate a digital signature, which includes the packet-sequence number 281. In one preferred embodiment, initially when the token is just manufactured, it has a packet-sequence number 281 of a small value, for example, 10. From that point on, every time the token generates 302 a new signature, the sequence number is incremented 304 by one, the message to be sent is hashed 306, and the token would encrypt 308 the hashed message with the redundancy bits and the sequence number to generate the new signature. Thus, this packet-sequence number 281 becomes one of the fields in the auditing bits 254. The packet-sequence number 281 frustrates most replay and insertion attacks on protocols. With the sequence number 281, a "stop transaction" order can be issued on all transactions after a certain sequence number to help trace lost or stolen tokens. Additionally, the sequence number ensures that there are never two identical signature packets generated by the same properly-functioning token. Two packets with the same sequence number, key ID and token ID is evidence that the token is malfunctioning. In one preferred embodiment, the packet-sequence number is 32 bits long.

Figure 5:
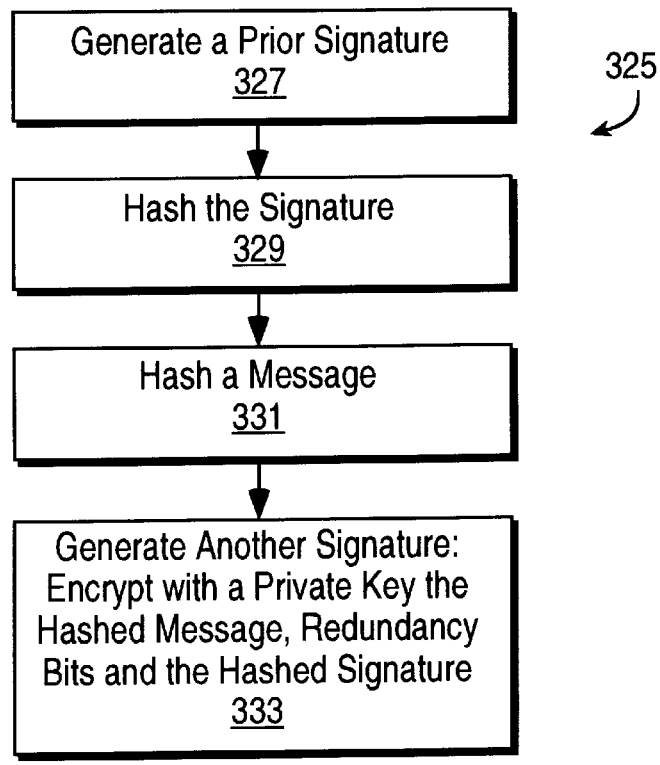
FIG. 5 shows a preferred method in the present invention to generate a digital signature, which includes a prior signature.

A field that includes the information of hashing the most recently signed signature is another way to create an audit trail for the message created. FIG. 5 shows a preferred method 325 in the present invention to generate such a digital signature. The token stores the last signature it signed, 327. When the token signs the next signature, the token would hash 329 the prior signature, hash 331 the message related to the next signature, and the token would encrypt 333 the hashed message with the redundancy bits and the prior signature to generate the next signature. This ensures a complete chain of past signatures by tracing every signature to get its prior signature. With such an implementation, defeating the tamper resistance of the token would not allow an attacker to alter previously completed transactions with signatures. This creates an audit trail that is almost as difficult to bypass as it is to find collision values for the hash function.

Figure 6:
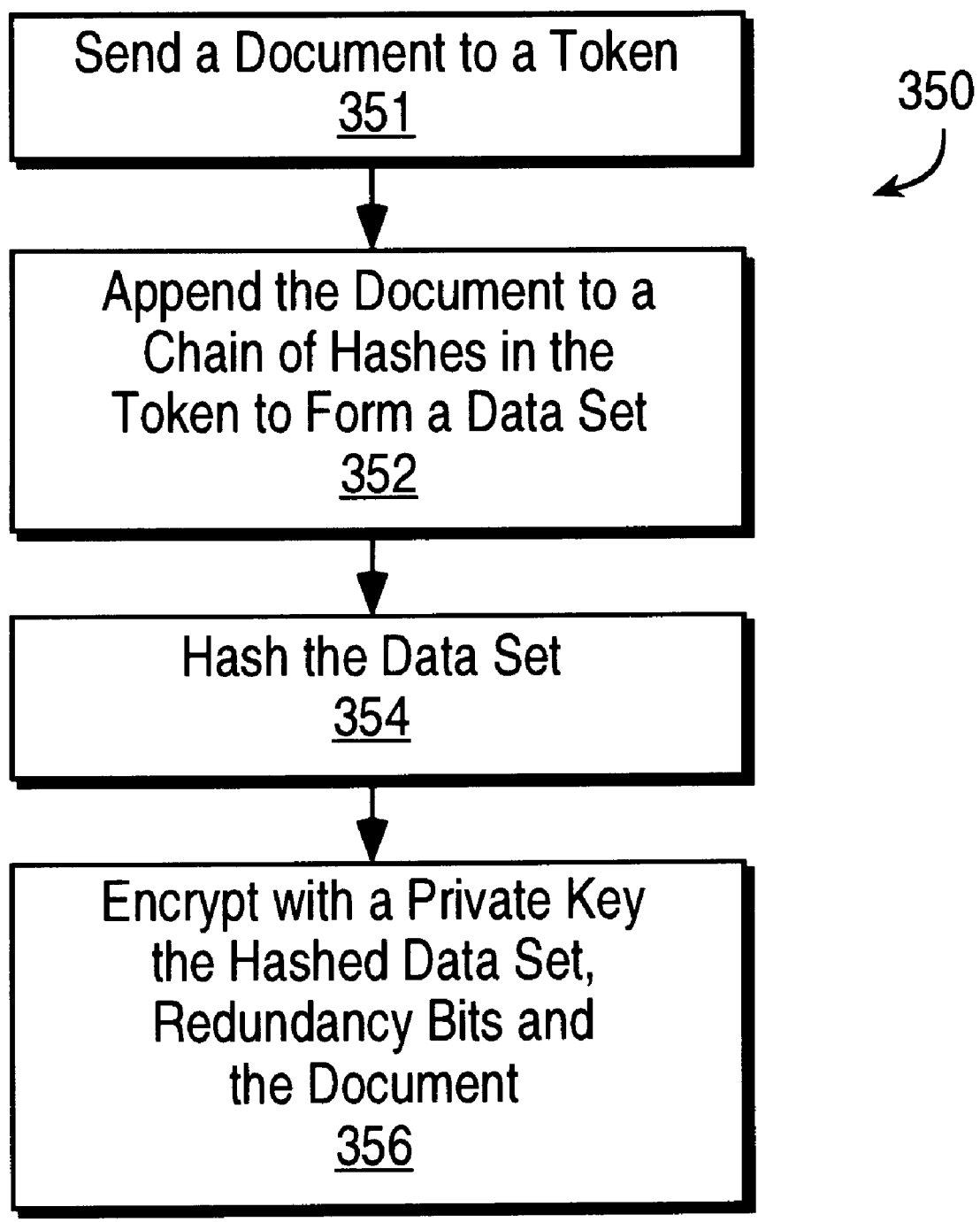
FIG. 6 shows a preferred method in the present invention to generate a digital signature, which includes prior messages.

Similarly, in another preferred embodiment of the invention, the hash of the most recent message is also included in the current message. In this preferred embodiment, the token stores the chain of messages it has signed, with each message hashed. When the token signs the next signature, the token would append the message related to the next signature to the chain of hashes in the token, hash the appended chain, hash the message, and encrypt 356 the hashed chain with the redundancy bits and the hashed message to form the next signature. At this point, the appended chain becomes the chain of messages. Another variation of the above method 350 is shown in FIG. 6. In that example, a document is sent 351 to the token 100, which would append 352 the document to a chain of hashes previously stored in the token to form a data set. The chain of hashes represent the hashes of the previous messages signed by the token 100. The token then hashes 354 the data set. Finally, the token encrypts 356 with its private key the hashed data set, redundancy bits and the received message, as in the method described in FIG. 1, with the hashed data set as the auditing bits. With every protocol message cryptographically dependent upon every previous protocol message, an auditable chain is created that extends through every transaction performed by the token 100. Again, this is intended to make recovery from various kinds of attack as easy as possible, and to leave a very strong audit trail; and as a side-effect, the chain of hashes produced frustrates insertion and replay attacks in any protocol where the chained hashes are checked, and all messages in the protocol are signed.

In one preferred embodiment, the internally generated time stamp, 285, and the random number, 287, are included as two separate fields in the signature-packet 250. Each may occupy 64 or 128 bits. Both values provide the guarantee that if the token's tamper-resistance has not been defeated, these values come directly from the token 100.

Note that the auditing bits may include more than one of the fields described above. A user may pick and choose whichever field or fields the user wants to be included in the packet. In fact, the auditing bits may include all the different fields shown in FIG. 3.

The signature packet's minimum size is determined by the size of the hash function's output, and the number of fields discussed above that have been included. The table below shows the number of bits required in applications such as RSA, for the signature packet of various hash function output sizes.

| Hash Size | Packet Size |
|---|---|
| 160 | 471 |
| 224 | 599 |
| 256 | 663 |
| 288 | 727 |

These packet sizes determine the smallest modulus size useable in RSA with the signature packet format. For example, using a 160-bit hash function such as SHA 1, one preferably needs a modulus of more than 472 bits. Preferably, the modulus has one more bit than the packet size, so that all valid signature packets is encoded. Using a 288-bit hash function, such as the concatenation of MD5 and SHA1, one preferably needs a 728-bit modulus.

Another requirement for the packet size is that it should be large enough so that after encryption, the result is almost impossible to de-encrypt without the available key. A task is considered impossible if it takes tremendous amount of computing time, for example, on the order of approximately 1030 operations with conventional computational methods and equipment, and with such de-encryption characterized by the class of mathematical functions known as one-way cipher functions. This implies that the packet size should preferably be more than 400 bits.

The invented signature packet formats described above can be applied to generate protocol building blocks, such as for interlocking and transmitting trusted values from the token 100. The building blocks simplify the design of robust and secure protocols.

Interlock

An interlock protocol is intended to convince two tamper-resistant user tokens that they are communicating with one another in real time and to prevent man-in-the middle attack. Such an interlock typically requires signatures. When there is a need for a signature, one of the above invented signatures is used. After the interlock protocol is performed, if all messages are signed with one of the above signature packet formats, then insertion, alteration, or replay of messages should be very difficult.

There are numerous algorithms for an interlock protocol. The following serves as one example of such an interlock. Note that the symbol certificate(x) denotes the certificate of x, which will not be further described because this function should be well known to those skilled in the art; and the symbol sign(x) denotes signing the message x with one of the preferred methods as described above. (1) user A:

a. Generates a random number, R0.
  b. Forms message M0=(R0, Certificate(user A)).
  c. Sends to user B M0, Sign(M0).

(2) user B d. Verifies Certificate(user A).
  e. Verifies Sign(M0).
  f. Generates a random number, R1.
  g. Forms M1=hash(M0), R1, Certificate(user B).
  h. Sends to user A M1, Sign(M1).

(3) user A i. Verifies Certificate(user B).
  j. Verifies Sign(M1).
  k. Verifies hash(M0).
  l. Forms M2=(hash(M1), first_protocol_message).
  m. Sends to user B M2, Sign(M2).

(4) user B
   n. Verifies Sign(M2).
   o. Verifies hash(M1).

At the end of step (3), user A has seen enough to verify that she is getting a response by someone who knows user B's private key, as specified in Certificate(user B), because he has returned a signed message, which includes a hash of her first (partially random) message, and a key certificate. After step (4), user B can verify that he's getting a response from someone who knows user A's private key, as specified in Certificate(user A), because he, too has gotten an appropriate response from his message. In both cases, they know that the other party has received their entire certificates intact, as well.

In the above example, verifying the certificates preferably denotes verifying the signatures, the valid dates (possibly the issued-date of the other party's certificate against the issued-date of the token's own certificate), and possibly checking the certificates against a list of known stolen or invalid key IDs or token IDs. Such verifying processes should be known to those skilled in the art.

While user A, the token, knows whom she's dealing with (user B, whose token ID and key ID are preferably noted inside Certificate(user B)), it is difficult to ensure that user A's human owner knows which user B she's interacting with. For applications in which this is a problem, it is a good idea to equip each token with some kind of display, and to show some human-readable identification from Certificate (user B). This gives the owner of user A, the token, an opportunity to end a transaction in which she does not want to be involved, or at least the knowledge that she has been involved in this unwanted transaction. The technique to put a display on a token is well known in the art, and will not be further described in this application.

Interlock With Privacy

The above interlock protocol can be extended to an interlock with privacy with two tokens, each having its own set of public and private keys, and with the interlock supporting a secure key exchange, and encrypted communications. Again, when there is a need for digital signature, one of the above invented signatures is used. There are many interlock-with-privacy schemes. The following shows one example of such an interlock-with-privacy, with similar symbols as the above example being of similar meanings. Note that PK(x) denotes x's public key, and PK_Encrypt(x, key=PK(y)) denotes encrypting x with y's public key.

(1) user A
   a. Generates a random number, R0.
   b. Forms message M0=(RO, Certificate(user A)).
   c. Sends to user B M0, Sign(M0).
(2) user B
   d. Verifies Certificate(user A).
   e. Verifies Sign(M0).
   f. Generates a random number, R1.
   g. Forms M1=hash(M0), R1, Certificate(user B).
   h. Sends to user A M1, Sign(M1).
(3) user A
   i. Verifies Certificate(user B).
   j. Verifies Sign(M1).
   k. Verifies hash(M0).
   l. Generates a random number, R2.
   m. Forms KE=(PK_Encrypt(R2, key=PK(user B)), PK_Encrypt(R2, key=PK(user A))).
   n. Forms M2=(hash(M1),KE).
   o. Sends to user B M2, Sign(M2).
   p. Forms session key KS=hash(R0,R1,R2).
(4) user B
   q. Verifies Sign(M2).
   r. Verifies hash(M1).
   s. Forms session key KS=hash(R0,R1,R2).

In the above example, R2 is encrypted under both user B and user A's public keys, so that either token can reproduce R2 to generate the session key KS. After step s, user A and user B sign the plaintext messages, then encrypt them and their signature packets under a symmetric algorithm using the session key KS. The specific symmetric algorithm should be specified by the signature packet version. In some systems, R2 is also encrypted under an auditor's public key so that the auditor can reproduce the session key KS.

Signature Package with Additional Information

Some protocols benefit from having the token generate some internal, trusted value, such as random numbers or time stamps. One example is based on the interlock example above, with the purpose of the interlock operation to be for user A to get such a trusted value from user B. User A's first_protocol_message is set to a request for a random number or a time-stamp. User B, after step o, responds by an acknowledgment message, signed with a signature packet, which applies one of the above invented signatures that includes a random value or a time stamp in the packet. The packet preferably should include the signature packet version, which indicates that this packet's random number or time-stamp emerges from the signature packet generated by the token 100. Another example is based on the interlock with privacy example above, which is for applications with these trusted values being private. After step s, the next message requests a random number or time-stamped signature packet, which is encrypted with the session key. The recipient of that message would respond with a random number or a time-stamp in the signature package, which is encrypted by the session key.

Digital Time-stamping Proxy Based on a Master Server

In one preferred embodiment, the present invention is applied in the area of a master digital time-stamp server. The tamper-resistant token card may sit on a network, and includes in its signature package a time-stamp. The card is available for users of the network to time-stamp their documents. As described in one of the above applications, the card retains a chain of hashes, which is formed from all the signatures it has signed. When a user sends his document to the token, the token would sign and time-stamp the document. Then, the document is appended to the chain of hashes to form a data set, which is hashed to form the new chain of hashes. The sequence of the chain follows the chronological order of the signatures signed. Perhaps once per week, the card sends its chain of hashes to a master time-stamp server to be time-stamped. The master server time-stamps the chain, sends it back to the card, but also retains the hash of the chain of hashes. Since the chain is stored in the server, the chain cannot be altered even if the tamper resistance of the card is defeated.

Again three tokens are used as an example for the above described operations: user A, the tamper-resistant token card, providing time-stamping service in its signature, as described above, and the master time-stamp server.

When user A has a hash value to get time-stamped, she interlocks with the token card, and sends her hash value as her first protocol message. In one preferred embodiment, after user A and the token card have completed steps (1) through (4) in the interlock protocol described above, the token card performs the following:

p. Forms M3=hash(M2).

q. Sends to user A M3, Sign_with_time-stamp(M3).

At this point, user A has a verification of her hash, time-stamped by the token card.

At a preset interval, such as a week, the token card interacts with the master server. First the token card and the master server interlock. Then, the token card sends its chain of hashes to the master server to be time-stamped. The token card ends up with a time-stamped verification of his chain. The master server retains the chain of hashes as a master proxy. In one preferred embodiment, the card token reinitializes its chain so that the next hash from user A will be the beginning of a new chain. These hashed chains in the master server could even be backed up off-site or off the network on a regular basis.

If the token card is stolen or broken into, the users who have interacted with the token card could get together to recreate their interactions with the token card, and could (with the master server's help) produce authentication of the order of their time-stamps since the token card's last interaction with the master server. Every interaction before that has been saved by the master server, and can be authenticated.

Auditable Applications Based on a Log

Figure 7:
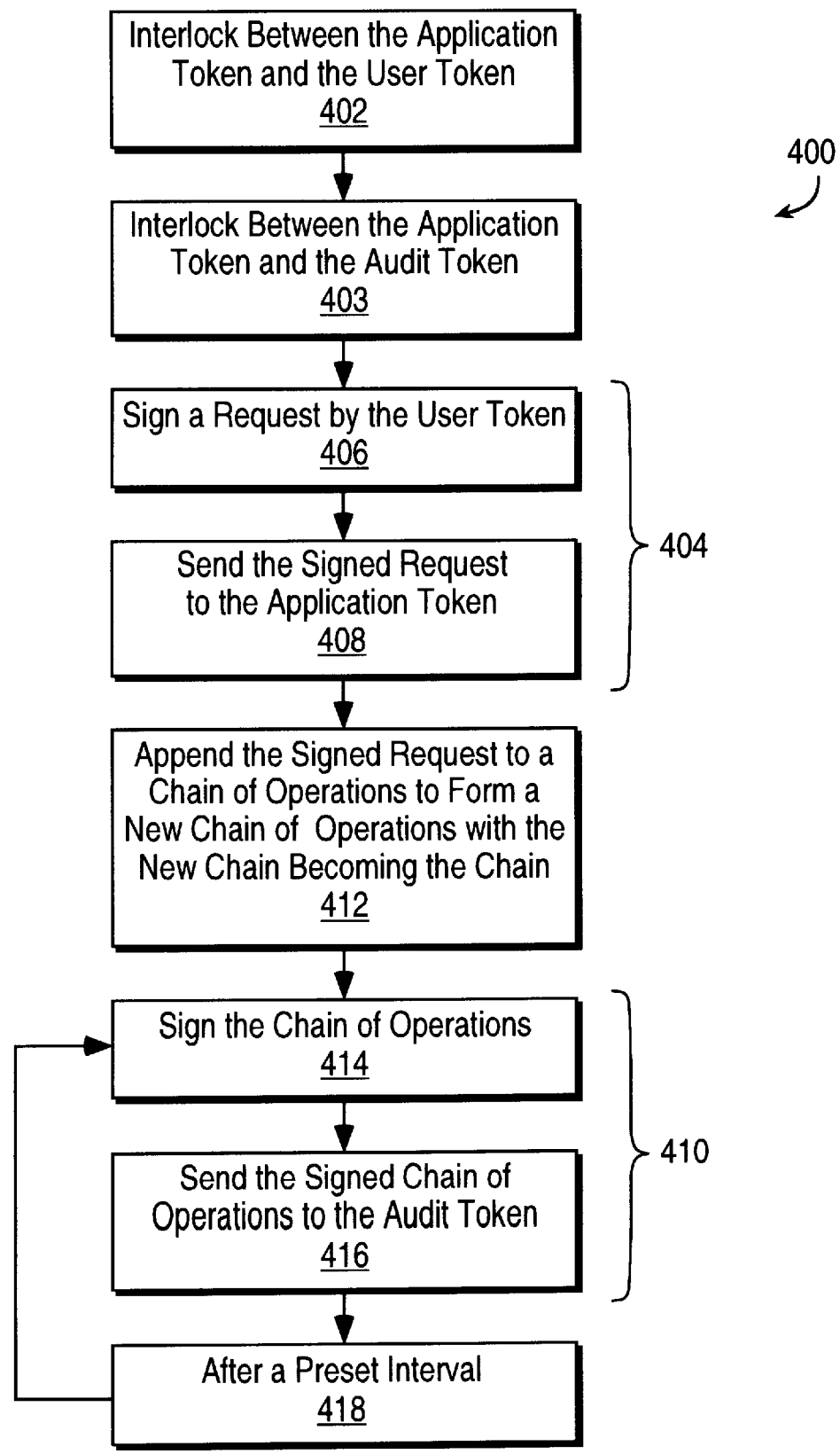
FIG. 7 shows an auditable application with a log by preferred methods in the present invention.

One way to establish a strong audit trail is to establish a log for every operation, and to make it very difficult to delete or alter the log without being detected. FIG. 7 shows an auditable application that establishes a log for every operation by preferred methods in the present invention.

As an example of the protocol, there are four players: the user token, the application token, the audit token, and the attacker. The user token first interlocks 402 with the application token, and then sends 404 the application token a request for some operation or information. The request process 404 is preferably achieved by signing 406 the request with one of the preferred methods in the present invention, and then sending 408 the signed request with the request to the application token. If the user token is authorized for such an operation—the application token knows the user token's identity after the interlock protocol—then the application token would perform the operation. In any case, the application token keeps the request in a log.

The audit token regularly interacts with the application token. First, they interlock 403, and then the audit token requests a copy of the log since their last interaction. The application token verifies that audit token is authorized for this, and if she is, sends 410 her the log, preferably encrypted and signed. The audit token can use the log to verify all transactions that have occurred in the time covered by the log. Note that the audit token may repeat 414 the process of asking for the log regularly because presumably the log should keep on changing as there should be more requests by the user token to the application token as time goes by.

In more detail, whenever a signed request is received by the application token, the request would be appended 412 to a chain of all the prior requests, and then with the entire chain hashed to form the new chain. When the application token sends 410 the log to the audit token, the application token typically digitally signs 414 the log and then sends 416 the log with its signature to the audit token. Note that the repeat process 418 may repeat from the point of signing 414 the log. Also, the interlock can also be an interlock-with-privacy. Additionally, as shown in the example on interlock-with-privacy, the application token may also encrypt R2 with the audit token's public key in step m, so that the audit token can also generate the session key.

With the above operations, the attacker after defeating the tamper-resistance of the user token still cannot change the log kept by the application token. Even if the attacker further defeats the tamper-resistance of the application token, any alterations the attacker makes will be detected by the audit token when she interlocks with the application token because she should be able to notice inconsistency in the log. The attacker can delete the log in the application token, but only for the short period of time between the audit token's interactions with the application token. In addition, if attacker wants to reverse engineer the application token, he has to somehow convincingly interact with audit token and one or more user tokens while doing it. Otherwise, the audit token and the user token will become aware of the application token being tampered.

The Guaranteed Checking Account

There are many payment protocols available these days. The following are examples demonstrating the ease of building good payment protocols with the invented signature packets.

One preferred embodiment allows a tamper-resistant user token to have a guaranteed checking account with sufficient funds to cover each "check" guaranteed by the card. It is important that the account the card draws on must be frozen while the card is interacting with another token to ensure that there is sufficient fund to be spent. The preferred embodiment creates an audit trail for the user's transactions.

In the preferred embodiment, any two user tamper-resistant tokens, such as user A and user B, can transfer money freely between them. Similar to checking accounts, if user A has $500 and user B has $200, it is possible for them to interact to distribute that $700 in any way they choose. However, the preferred embodiment preferably prevents them to interact in such a way that their total money becomes more or less than $700. Also, in the preferred embodiment, user A can reconcile its account with a bank token. If there is an intruder attacking user A's account, an audit token and the bank token may be able to recover from it.

User A and User B Interact

Figure 8:
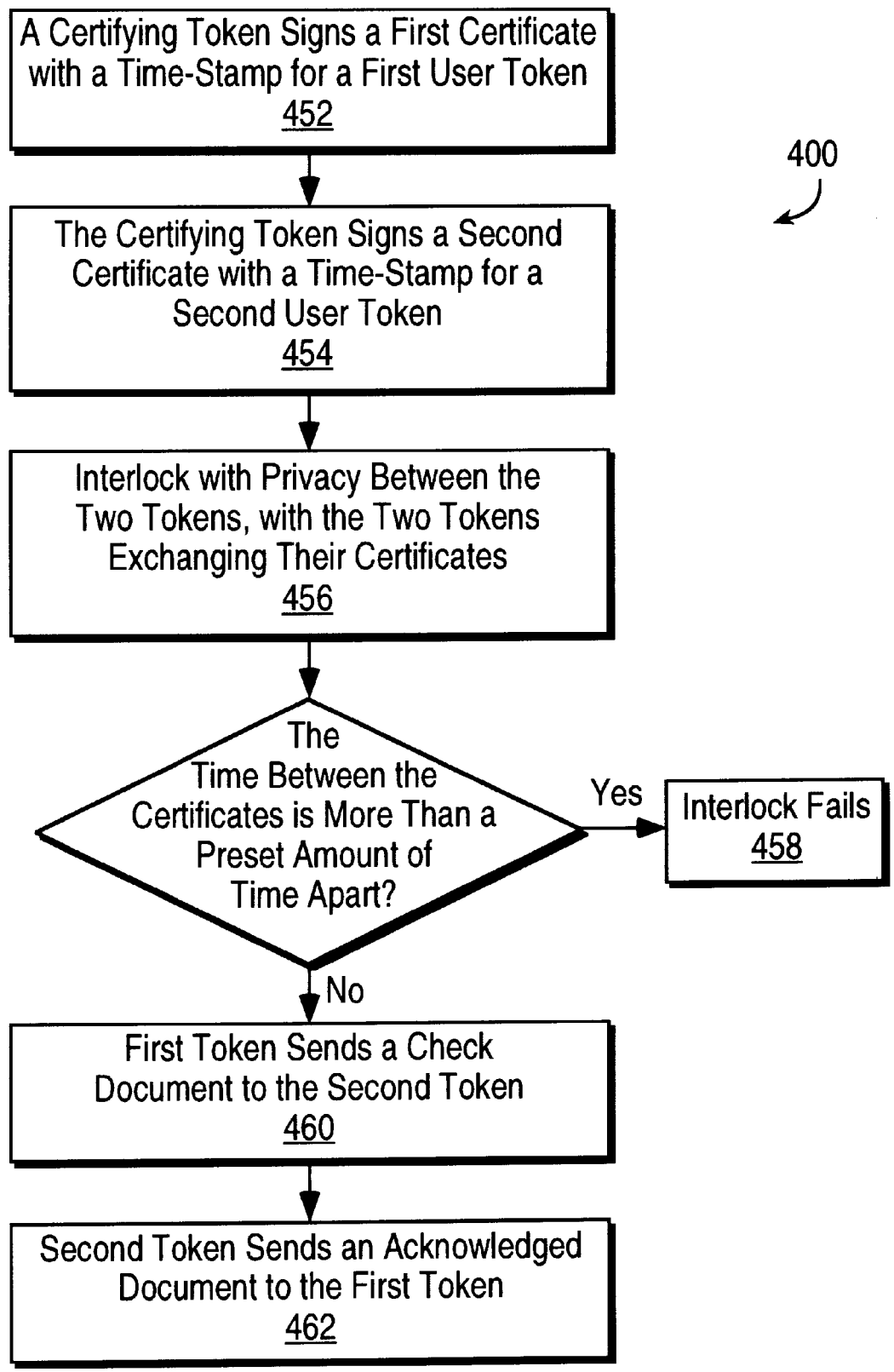
FIG. 8 shows a spending application based on a guaranteed checking account with digital signatures generated by preferred methods in the present invention.

FIG. 8 shows one set of preferred steps 450 for user A to interact with user B, such as when user B asks user A for a transfer of funds. To start the process, user A and user B each obtain 452, 454, a certificate from the bank token, which acts as a certifying token. The bank account digitally signs the certificates with one of preferred methods described above that includes time-stamps in the signature package. The time-stamp indicates the issue date of a certificate.

After getting their certificates, user A and user B interlock 456, and exchange their certificates. If the issue dates of the two tokens' certificates are more than a preset amount of time apart, such as a week, then the tokens refuse to accept the certificates as valid, and the interlock protocol fails, 458. This precaution is to limit the total amount of time that a rogue card—one which has been reverse-engineered—can possibly write bad "checks." The smaller the preset amount of time, the more often tokens have to interact with the bank token, but also the less time a rogue token has to write bad checks. If the issue dates of the two tokens' certificates are within the preset amount of time apart, user A would send 460 user B an encrypted and signed "check." In one preferred embodiment, the check is signed by one preferred method as described in the present invention. The check should indicate user A's account number, and the amount of money to be transferred. In one preferred embodiment, their account numbers are the hashes of their public keys, which preferably have been exchanged with the certificates in the interlock protocol. At this point, the protocol ends with an acknowledgment message 462 from user B. In one preferred embodiment, the acknowledgment message is signed by user B through one of the preferred methods in the present invention. After the transactions, both user A and B adjust their internal balances, and go on about their business. If user A does not receive the acknowledgment message, she flags it as an error condition and assumes that the money has been transferred to user B. This should be relatively rare, but it needs to be defined to prevent some classes of attacks.

In another preferred embodiment, user A and user B interlock with privacy, for example, with the method as described above. Then, preferably, R2 should be encrypted in step m by the bank token's public key so that the bank token can also generate the session key to access the transactions.

Reconciling with the Bank

The purpose of reconciliation is for user A to send her accumulated logs of transactions to the bank token for verification, and then for the bank token to send her the verified account for her to reconcile with her log. Typically, the bank would also send her a new certificate, and a new list of invalid keys or certificates that she should not interact with.

The preset time for a user to renew his certificate defines how often each user must reconcile with the bank, because the bank issues certificates. If the preset amount of time is 20 days, then each token must reconcile with the bank every 20 days, or his token becomes inoperable. If the preset amount of time is 5 days, then there is only a very short window for a user with a hacked token to write bad checks, before his token is permanently frozen. The bank token may even discount a high-volume user, who operates with a lower preset amount of time, perhaps reconciling once per day.

If user A complains to the bank that someone has stolen her token, the bank would not re-issue a valid certificate to the user token, so the robber could only have a few days of spending left. Additionally, the token ID and the key ID should preferably be put on the reject-list, which the bank token sends with every certificate it issues. It would become very difficult for the robber to use the stolen token, or for the user of a hacked token to write bad checks. Reconciliation should be possible by telephone so long as the token's certificate has not lapsed. If it has lapsed, then the token should need to be brought into a branch office of the bank—this gives the bank some chance of noticing physically hacked tokens, and also leaves the bank with pictures on its security cameras of some of the people involved.

FIG. 9 shows a reconciliation application 500 based on a guaranteed checking account using preferred methods in the present invention. First, user A and the bank token interlock, 502, which can be an interlock-with-privacy. Next, user A obtains 504 a certificate from the bank token. The user A's certificate should be constantly renewed within a preset period of time. Then, user A signs 506 her transaction log since her last reconciliation, and sends 508 the log with her signature to the bank token. The signing process is based on one of the preferred signing process in the present invention. The transaction log includes all the transaction the user token has been involved. The bank token, based on the user's account the bank has, verifies 510 that her transactions do not disagree with other information available to the bank token, and that the log is internally consistent. User A may also request some additional transactions, such as moving money into or out of her account. The bank token may perform, refuse, or forward the requests to some other party that can decide whether to perform them. The bank token then transmits 512 user A her current verified balance. In one preferred embodiment, the bank token may send user A her new certificate in the same message. User A verifies and reconciles the current account with her log, and may send the bank token a receipt. The bank token may sign the receipt and sends it back to user A. If she does not get this receipt, she must call back and interact with the bank token again to deal with this issue. If user A has had some transactions without proper receipts, she can note this in her transaction logs, and the bank token should reconcile this as well as possible. If the bank token has not yet heard from the other parties in those transactions without receipts, the bank token may readjust user A's account.

As soon as the bank token learns of overdrawn checks or stolen or lost tokens, the bank token adds those defective tokens' certificates, preferably with their key and token ID, to the bad certificate list, and refuses to issue those tokens another certificate until problems have been resolved.

Audit

In one preferred embodiment, the bank token routinely interacts with the audit token, such as once a day. The bank token and the audit token interlock-with-privacy. Then the bank token sends the audit token the logs that have come in since their last interaction, and gets back a time-stamped receipt. Again, the logs can be in the form of chain of hashes as described above. With the logs from the bank token in the audit token, even if someone defeats the bank token's tamper-resistance, the previous logs cannot be changed, and it should be possible to verify that the logs are correct up to the point of breaking the tamper-resistance.

Distributed Tokens

The audit trail discussed above may be performed by a network of tokens. For example, instead of one audit token, there are many time-stamping proxies or tokens. Each is implemented in tamper-resistant hardware, with, for example, a tamper-resistant clock. The audit tokens continuously interact, such as every so often, the first audit token backs up its logs and gets a time-stamp from the second audit token. The back up process is preferably by one of the preferred method in the present invention, for example, digitally signing the logs and sending the log with its signature to the second audit token. Such a design further increases the security of the system.

From the foregoing it should be appreciated that a signature package has been invented that includes audit and other information. This signature package can be applied to many different protocol to increase the security of those protocol, without wasting space that could be used for messages.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

We claim:

1. A method for performing a cryptographically assured electronic transaction requested by a user module, and providing multiple independent audit trails therefor, comprising the steps performed by an application module of:

(a) cryptographically interlocking with a user module;

(b) receiving, from said user module, a cryptographically verifiable transaction request;

(c) cryptographically verifying said received transaction request;

(d) electronically performing said transaction;

(e) logging said performed transaction as part of a digitally signed hash chain including at least one previously performed transaction, to provide a first cryptographically assured audit trail of said transaction;

(f) cryptographically interlocking with an auditing module separate from said application module; and (g) transmitting said hash chain to said auditing module, to provide thereat a second cryptographically assured audit trail of said transaction, independent of said first audit trail in said application module.

2. The method of claim 1 where said transaction request is for a digital timestamp of a user message.

3. The method of claim 2 where said second cryptographically assured audit trail includes a digital timestamp of the receipt, at said auditing module, of said first cryptographically assured audit trail.

4. The method of claim 1 where said application module is a time stamping module, and where said auditing module is a master time stamping module.

5. The method of claim 1 where said receiving step (b) occurs after each receipt of a transaction request from said user, and where said transmitting step (g) occurs after receiving a plurality of transaction requests from users of said application module.

6. The method of claim 1 where said application module is a bank module, and where said transaction is an electronic payment order from a guaranteed checking account of said user to an electronic payee module.

7. The method of claim 6 further comprising the step, after said step (a), of cryptographically interlocking with said electronic payee module, and wherein said user module sends said payee module an electronic check if a temporal interval between (i) said user module's interlock with said bank module, and (ii) said payee module's interlock with said bank module, is less than a predetermined limit.

8. The method of claim 7 where each said step of interlocking includes transmitting a signed certificate from said bank module to said module interlocking therewith.

9. The method of claim 8 where said signed certificate includes a timestamp from said bank module.

10. The method of claim 7 where said electronic check includes an account number of said user and an amount of money to be transferred to said payee.

11. The method of claim 6 further comprising the step of electronically reconciling account balance records held by said user module and said bank module.

12. The method of claim 11 where said reconciling step includes:

(i) receiving, from said user module, a log of transactions conducted thereby;

(ii) cryptographically verifying that said received log is proper;

(iii) transmitting, to said user module, a verified balance of said user's account balance.

13. The method of claim 12 where said step of verifying said log includes checking that said log does not disagree with information available to said bank module.

14. The method of claim 12 where said step of verifying said log includes checking that said log is internally consistent.

15. The method of claim 1 where at least one of said modules is a tamper-resistant hardware token.

16. The method of claim 1 where at least one of said modules is a secure software application.

17. A cryptographic application module for performing a cryptographically assured electronic transaction requested by a user module, and providing multiple independent audit trails therefor, comprising:

(a) means for cryptographically interlocking with a user module;

(b) means for receiving, from said user module, a cryptographically verifiable transaction request;

(c) means for cryptographically verifying said received transaction request;

(d) means for electronically performing said transaction;

(e) means for logging said performed transaction as part of a digitally signed hash chain including at least one previously performed transaction, to provide a first cryptographically assured audit trail of said transaction;

(f) means for cryptographically interlocking with an auditing module separate from said application module; and (g) means for transmitting said hash chain to said auditing module, to provide thereat a second cryptographically assured audit trail of said transaction, independent of said first-audit trail in said application module.

18. The application module of claim 17 configured as a bank module, wherein said transaction is an electronic payment order from a guaranteed checking account of said user to an electronic payment module.

19. The application module of claim 18 further comprising means for reconciling account balance records held by said user module and said bank module.

20. The application module of claim 19 wherein said means for reconciling includes:

(i) means for receiving, from said user module, a log of transactions conducted thereby;

(ii) means for cryptographically verifying that said received log is proper; and (iii) means for transmitting, to said user module, a verified balance of said user's account balance.

* * * * *